United States Patent [19]

Tanaka

[11] Patent Number: 5,013,349

[45] Date of Patent: May 7, 1991

[54] SOIL CONDITIONER AND METHOD OF PRODUCING THE SAME

[75] Inventor: Koji Tanaka, Okayama, Japan

[73] Assignee: Japan Exlan Company Limited, Osaka, Japan

[21] Appl. No.: 524,037

[22] Filed: Aug. 17, 1983

[30] Foreign Application Priority Data

Aug. 30, 1982 [JP]  Japan ................................. 57-151047

[51] Int. Cl.$^5$ ................................................ C05G 3/04
[52] U.S. Cl. ............................................ 71/27; 71/903; 526/306; 525/296; 106/900
[58] Field of Search ......................... 526/306; 525/296; 71/903, 27, 11, 1; 106/900

[56] References Cited

U.S. PATENT DOCUMENTS 3,336,129  8/1967  Herrett et al. ........................... 71/92
3,900,378  8/1975  Yen et al. ................................ 71/903

*Primary Examiner*—Ferris H. Lander

[57] ABSTRACT

The present invention provides a soil conditioner composed of a powdery or granular composition in which a filler is integrally included in hydrogel and a method of producing the same wherein an aqueous solution of a hydrophilic cross-linkable polymer is mixed with a filler and then the mixture is subjected to cross linking treatment by which the polymer is made to have cross-linked structure and formed into gel. Since the filler is integrally included in hydrogel, the soil conditioner, when mixed with soil, does not separate into the respective components, and there is no problem of the hydrogel emerging up to the surface of soil with the passage of time.

14 Claims, No Drawings

SOIL CONDITIONER AND METHOD OF PRODUCING THE SAME

BACKGROUND OF THE INVENTION

1. Field of the Invention

The present invention relates to a soil conditioner composed of a powdery or granular composition in which a specific filler is integrally included in hydrogel.

2. Description of the Prior Art

As one of the uses of a water-insoluble resin (hydrogel) which absorbs water to a quantity of from 20 to 1000 times its own weight, it has been heretofore suggested to give water-holding properties by mixing it with soil. However, since the specific gravity of the hydrogel is small, it is very difficult to mix it with soil or even it can be mixed with soil the hydrogel comes up to the surface of soil with the passage of time. Therefore, when the mixture is applied to the lawn of a golf course for example, the surface will become whitish with the result that the appearance is impaired. Furthermore, the application of such a mixture hinders air from coming into soil. This causes root rotting or the propagation of mold. Accordingly, it was tried to use as soil conditioner a premixture of hydrogel and a material such as sand having a large specific gravity. But the mixing operation is very difficult, and moreover the separation also takes place easily upon packing, transportation, or application. Therefore, this method can not become a means for solving the problem of the emergence of hydrogel to the surface of soil.

SUMMARY OF THE INVENTION

Under such circumstances, we conducted research to eliminate the above-mentioned disadvantage and to find a method which makes it possible to easily mix hydrogel and a material (filler) such as sand having a large specific gravity and which does not easily allow the separation of such a mixture into the respective components. As a result, it has been found that, when the water-soluble polymer before the formation of hydrogel is mixed with a filler and thereafter hydrogelized by introducing cross-linked structure, the filler is firmly and integrally included into the hydrogel and does not separate from the mixture. The present invention is based on this discovery.

An object of the present invention is to provide a soil conditioner having a high specific gravity, easily mixable with soil, not separable into respective components and free from anxiety for the emergence of hydrogel to the surface of soil, and to provide a method of producing said soil conditioner in an industrially advantageous manner.

Another object of the invention is to provide a soil conditioner which can give water-holding properties as well as air-permeability and voluminosity to soil, and thereby can promote plant growth and to provide a method of producing such a soil conditioner.

The soil conditioner of the present invention to attain such objects is composed of a powdery or granular material, in which a filler having a specific gravity more than 1.5 and a particle diameter less than 1 mm is included integrally into hydrogel, and which has a specific gravity more than 1.3. Such a soil conditioner can be advantageously produced by mixing an aqueous solution of a cross-linkable hydrophilic polymer with a filler having a specific gravity more than 1.5 and a particle diameter less than 1 mm, then drying the mixture after or at the same time with cross-linking operation or subjecting the mixture to cross-linking operation after drying, and forming the mixture into powdery granules to produce a powdery or granular material having a specific gravity more than 1.3.

DETAILED DESCRIPTION OF PREFERRED EMBODIMENT

As the fillers of the present invention, any can be used without limitation on their kind, so far as they have a specific gravity more than 1.5, preferably more than 2.0, and a particle diameter less than 1 mm, preferably 0.5–500$\mu$, and do not exert any adverse effect on plant growth. As examples of such fillers, there can be mentioned sand, earth, diatomaceous earth, coal ash, slag, red mud, stone powder, glass powder, terra-alba, talc, calcium carbonate, barium sulfate, titanium oxide, zinc oxide, etc. Among others, sand is preferable industrially in that a material of relatively uniform properties such as particle diameter, specific gravity, etc. can be supplied at low cost.

The use of a filler, of which the specific gravity is outside the lower limit, must be avoided because it is impossible to attain the object and effect of the present invention intended to overcome the difficulty of hydrogel emergence to the surface of soil, or the difficulty of mixing with soil upon use. Also, when the particle diameter is outside the above-mentioned range, it becomes difficult to include such a filler into hydrogel uniformly and integrally, and in addition, the mixing operation with soil upon use becomes difficult. Therefore the use of such a filler must be avoided.

In order to make such a filler integrally included into hydrogel, it is necessary to mix the filler with an aqueous solution of a cross-linkable hydrophilic polymer and then introduce cross-linked structure into the polymer to hydrogelize the polymer.

Such hydrophilic polymers are substantially water-soluble polymers capable of causing cross-linking reaction between molecules and containing one or more hydrophilic groups selected from ionizable groups such as carboxyl group, sulfonic acid group, phosphoric acid group, or their salts, quaternary ammonium salt group, etc. and nonionic hydrophilic groups such as hydroxyl group, ether group, amid group, N-methylol group, etc. There is no limitation on the methods of introducing cross-linked structure into the polymer, and a method can be suitably selected from known methods such as the use of an aqueous solution of a hydrophilic polymer in which a cross-linking agent is present, utilization of acid condensation reaction, or cross-linking by ionizing radiation. Among others, the use of an aqueous solution of a hydrophilic polymer containing a cross-linking agent such as formaldehyde, epichlorohydrine, hydrazine, tetraoxane, etc. or an aqueous solution of a hydrophilic polymer containing combined therewith a desired quantity of N-methylol groups is desirable, because the quantity of cross-links to be introduced can be easily regulated, and moreover the cross-linking reaction can be caused in the subsequent heating steps such as drying.

The procedure of introducing cross-linked structure may be carried out in any order, either before or after the drying step, or at the same time with drying. The pulverization is usually carried out after the cross-linking and drying steps. However, as in spray drying method, cross-linking, drying and pulverization can be carried out at the same time in the same process step. That is to say, in making a filler included integrally into hydrogel, so far as the cross-linkable hydrophilic polymer (containing a cross-linking agent depending on the case) and the filler are mixed uniformly before introduction of cross-linked structure into the polymer (before hydrogelation of the polymer), the order of the steps of cross-linking, drying, and granulation may be suitably selected. There is no limitation on the conditions or apparatus for drying and granulation. However, in the case of introducing cross-link structure at the same time with drying, it is desirable, from the viewpoint of industrial practice, to employ the conditions of a temperature not lower than 80° C., preferably not lower than 100° C. and a time from 10 to 120 minutes.

As the solvent for preparing the above-mentioned aqueous solution, water is preferable because of industrial convenience. However, if desired, it is possible to use a mixed solution of water and a water-miscible organic solvent such as alcohol, acetone, dimethyl sulfoxide, dimethylformamide, etc.

As for the concentration of the hydrophilic polymer in the aqueous solution, a high concentration is preferable for reducing the load in the drying step. However, it is desirable to set the concentration within the range of from 5 to 40 weight %, more preferably from 10 to 30 weight %, because this concentration, coupled with its ease of mixing of the filler and the later-mentioned mixing ratio of the filler, makes the integral inclusion of the filler, i.e. the object of the present invention, more easy.

As for the ratio of the filler to be mixed with an aqueous solution of a cross-linkable hydrophilic polymer, it is necessary to vary it, depending on the kind of the hydrophilic polymer and filler, the concentration of the aqueous solution, the desired water-holding capacity of the final product, etc. and therefore it is difficult to determine it at a definite value. However, it is desirable to determine it within the range of about 20 to 90%, more preferably 30 to 80%, based on the dry weight of the powdery/granular product, on the condition that the specific gravity of the product finally obtained is more than 1.3.

It is necessary for the powdery/granular product to have a specific gravity more than 1.3, preferably more than 1.4. When the specific gravity is outside this range, it is impossible to overcome the difficulty of mixing it with soil or the problem of the hydrogel emergence to the surface of soil.

As a matter of course, the particle diameter of such granules is larger than the particle diameter of the filler to be mixed. For the attainment of the object of the present invention, however, it is desirable that the granules should prepared so as to have a particle diameter within the range of $1\mu$ to 5 mm, more preferably from $50\mu$ to 2 mm. Also, as for the water-swellability of the granular product, it is desirable to adjust it to more than 5 cc/g, more preferably to within the range of from 10 to 500 cc/g.

It is desirable to cover the granules with an antiadhesive agent because such treatment will prevent the particles from being united and becoming larger and improve the dispersing properties of the particles into soil. As such antiadhesive agents, any materials can be employed so long as they do not exert any adverse effect on plant growth. Such antiadhesive agents include, for example, diatomaceous earth, sand, earth, coal ash, red mud, stone powder, glass powder, terra alba, talc, etc.

The above-mentioned soil conditioner of the present invention can be dried more effectively in the production process in comparison with a product composed singly of hydrogel. Also, in this soil conditioner, the filler is integrally included in hydrogel, and therefore there is no separation between the filler and hydrogel. Furthermore, since its specific gravity is heightened so as to be near that of soil, its mixing operation with soil upon use is very easy. Also, there is no problem of hydrogel emerging to the surface of soil with the passage of time. In addition, this soil conditioner can give soil more air-permeability and voluminosity in comparison with a product of hydrogel only, so that there is no problem of root rotting, etc. These are the characteristic effect of the present invention.

In the following, the present invention will be explained in further detail by way of Examples. However, it is to be understood that the invention is not limited for its scope by the description of the Examples, wherein all parts and percentages are by weight unless otherwise indicated.

EXAMPLE 1

Seventeen parts of an acrylonitrile copolymer (molecular weight, as indicated by the limiting viscosity number $[\eta]$ measured in dimethylformaldehyde, is 1.5) composed of 90% acrylonitrile and 10% methyl acrylate, was suspended in 83 parts of an aqueous 10% solution of caustic soda. By stirring at 90° C. for 45 minutes, an aqueous solution of a polymer containing about 70% sodium acrylate and about 30% acrylamide was obtained. After neutralizing it with an aqueous sulfuric acid solution, 6.7 parts of an aqueous 6.0% formaldehyde solution was added for 100 parts of the polymer solution to produce an aqueous solution (a) of a cross-linkable hydrophilic polymer.

One hundred parts of said aqueous solution was mixed with 26 parts of sand having a specific gravity of 2.5 and capable of passing through a 200-mesh sieve. The mixture was then dried at 180° C. for 180 minutes to cause cross-linking reaction. Thereafter, the mixture was pulverized to form granules having a particle diameter less than 1 mm to produce Sample A.

For comparison, Sample B was produced by drying and pulverizing in the same way as above except that sand was not mixed with the aqueous solution (a).

Ten parts of water and 40 parts of the above-mentioned sand were mixed with 40 parts of Sample B, and the mixture was dried and pulverized in the same way as above to produce Sample C. In producing Sample C, the mixing operation with sand was very difficult.

The results of measurement of the properties of the thus-obtained Samples are shown in Table 1.

TABLE 1

| Sample | Specific gravity | Degree of water-swellability (cc/g) (1) | Water-holding capacity (%) (2) | Emergence to the surface of soil (3) | |
|---|---|---|---|---|---|
| A | 1.9 | 105 | 55.8 | Scarcely observed | Sample of the invention |
| B | 1.2 | 120 | 51.9 | Considerably observed | Sample of comparison |
| C | 1.8 | 115 | 52.2 | Fairly observed | Sample of comparison |

NOTE (1)

Water-swellability (cc/g)

About 0.5 g of the sample is immersed in water and is maintained at 25° C. After 24 hours, the sample is a water-swollen state is held between two sheets of filter paper to remove water. This operation is repeated three times. The weight of the sample thus regulated is measured ($W_1$ g). This sample is dried in a vacuum drier at 80° C. until it reaches a constant weight ($W_2$ g). From the measurement results, the water-swellability is calculated by the following formula:

$$\text{Water-swellability} = \frac{W_1 - W_2}{W_2}$$

NOTE (2)

Water holding capacity (%)

Four g of the sample is mixed with 1 liter of mountain sand. The water-holding capacity of the mixture is measured in accordance with the method of Japan Society of Agricultural Science. The water-holding capacity of the mountain sand only is 44.8%.

NOTE (3)

Emergence to the surface of soil

Four hundred grams of the sample is mixed with sandy loam of a test field (2 m$^2$) to the depth of 10 cm. On every third day, 200 liters of water is sprinkled over one hour. After 12 days, the quantity of the sample emerging to the surface of soil is evaluated by visual observation.

It is understood from the results in Table 1 that the product of the present invention has an excellent water-holding capacity and has no problem of emerging to the surface of soil.

As for the Samples of comparison, they were not only inferior in performance but also difficult in mixing with mountain sand or sandy loam used for the measurement of their performance, but the product of the present invention could be easily mixed.

EXAMPLE 2

Each of Samples (A–C) produced in Example 1 was mixed with sandy loam in the proportion of 2 g/liter. 0.15 g seed was sowed for one pot (150 cm$^3$). From December 10, greenhouse cultivation was carried out for two months. Water was sprinkled in the ratio of 160 ml/3 days. As initial and additional fertilizer, Sumitomo Liquid Fertilizer No. 1 (Sumitomo Chemical Co. Ltd.) diluted to 100 times was given in the ratio of 20 ml/pot.

The results of measurement of the state of plant growth are shown in Table 2.

TABLE 2

| Sample | Seaside creeping bent grass | | Italian rye grass Average height (cm) |
|---|---|---|---|
| | Average height (cm) | Growth quantity on the earth (g) | |
| A | 5.8 | 11.6 | 8.5 |
| B | 5.3 | 10.3 | 7.2 |
| C | 4.5 | 7.2 | 5.8 |
| Without addition | 3.5 | 4.3 | 3.8 |

It is understood from the results in Table 2 that the product of the invention has an excellent effect on plant growth.

EXAMPLE 3

Each of Samples A–C produced in Example 1 was scattered on a test field (20 m$^2$) of sandy loam, and after one hour the earth was plowed with a cultivator to the depth of 10 cm.

The mixability with earth was observed for each sample. The product of the invention (Sample A) showed good operability and no particle clod was observed. As for Samples B and C, many adhering masses, several cm in diameter, were observed.

EXAMPLE 4

Five parts of polyvinyl alcohol (degree of polymerization: 500) and 8 parts of polyacrylic acid (inherent viscosity in aqueous 1N NaCl solution at 40° C.: 1.92) were dissolved in 87 parts of water. Five parts of aqueous 10% sulfuric acid was added to the solution to acidify it. One hundred parts of the solution was mixed with 11 parts of sand having a specific gravity of 2.5 and capable of passing through a 200-mesh sieve. The mixture was then heated at 100° C. for 9 hours to cause cross-linking reaction simultaneously with water removal and drying, and was neutralized with an aqueous caustic soda solution, washed with water and dried. Thereafter, the mixture was pulverized to a particle diameter less than 1 mm to produce Sample D.

Four parts of water-soluble starch and 10 parts of polyacrylic acid (inherent viscosity: 1.92) were dissolved in 86 parts of water. In the same way as above, acidification and mixing with sand (13 parts) were carried out. The mixture was then heated at 130° C. for one hour to cause cross-linking reaction at the same time with water removal and drying, and was neutralized, washed with water, dried and pulverized in the same way as above to produce Sample E.

The properties of the samples thus obtained were measured in the same way as in Example 1, and the results are shown in Table 3.

From the results in Table 3, it is understood that the product of the present invention has excellent performance.

TABLE 3

| Sample | Specific gravity | Degree of water-swellability (cc/g) | Water-holding capacity (%) | Emergence to the surface of soil |
|---|---|---|---|---|
| D | 1.7 | 98 | 54.1 | Scarcely observed |
| E | 1.8 | 118 | 55.9 | Scarcely observed |

What is claimed is:

1. A soil conditioner composed of a powdery or granular material, in which a filler having a specific gravity more than 1.5 and a particle diameter less than 1 mm is uniformly distributed within and integrally included in a hydrogel, and which soil conditioner has a specific gravity more than 1.3, said soil conditioner being prepared by uniformly mixing an aqueous solution of a cross-linkable hydrophilic polymer and a filler having a specific gravity more than 1.5 and a particle diameter less than 1 mm; drying the mixture after cross-linking or simultaneously with cross-linking, or cross-linking after drying; pulverizing the mixture to form a powdery or granular product having a specific gravity more than 1.3, whereby said cross-linked hydrophilic polymer forms a hydrogel with the filler materials distributed within said hydrogel.

2. The soil conditioner as claimed in claim 1 wherein the mixing ratio of the filler is from 20 to 90% based on the weight of the powdery or granular material.

3. The soil conditioner as claimed in claim 1 wherein the filler is sand.

4. The soil conditioner as claimed in claim 2 wherein the degree of water-swellability of the powdery or granular material is more than 5 cc/g.

5. The soil conditioner as claimed in claim 4 wherein the particle diameter of the powdery or granular material is from 1μ to 5 mm.

6. The soil conditioner as claimed in claim 5 wherein the powdery or granular material is covered with an anti-adhesive agent.

7. A method of producing a soil conditioner characterized by uniformly mixing an aqueous solution of a cross-linkable hydrophilic polymer and a filler having a specific gravity more than 1.5 and a particle diameter less than 1 mm; drying the mixture after cross-linking or simultaneously with cross-linking, or cross-linking after drying; pulverizing the mixture to form a powdery or granular product having a specific gravity more than 1.3.

8. The method of producing a soil conditioner as claimed in claim 7 wherein an aqueous solution of a hydrophilic polymer, containing formaldehyde, epichlorohydrine, hydrazine or tetraoxane, or an aqueous solution of a hydrophilic polymer containing combined with its molecule a N-methylol group is used as the aqueous solution of the cross-linkable hydrophilic polymer.

9. The method of producing a soil conditioner as claimed in claim 8 wherein an aqueous solution of a cross-linkable hydrophilic polymer having a concentration of from 5 to 40 weight % is used.

10. The method of producing a soil conditioner as claimed in claim 9 wherein a filler is mixed in a quantity of from 20 to 90% based on the weight of the powdery or granular product.

11. The method of producing a soil conditioner as claimed in claim 10 wherein the mixture is dried at a temperature not lower than 80° C. for 10 to 120 minutes to cause cross-linking reaction at the same time.

12. The method of producing a soil conditioner as claimed in claim 11 wherein the mixture is formed into a powdery or granular product having a water-swellability more than 5 cc/g.

13. The method of producing a soil conditioner as claimed in claim 12 wherein the pulverization is carried out so that the particle diameter of the powdery or granular product becomes 1μ to 5 mm.

14. The method of producing a soil conditioner as claimed in claim 7 wherein the powdery or granular product is covered with an anti-adhesive agent.

* * * * *